(12) United States Patent
Okada

(10) Patent No.: US 7,599,201 B2
(45) Date of Patent: Oct. 6, 2009

(54) METHOD OF CONTROLLING THE DUTY OF A PWM SIGNAL, PWM SIGNAL GENERATING CIRCUIT, AND IMAGE FORMING APPARATUS USING SAME

(75) Inventor: Hiroyuki Okada, Izumi (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 0 days.

(21) Appl. No.: 11/148,892

(22) Filed: Jun. 9, 2005

(65) Prior Publication Data

US 2005/0276080 A1    Dec. 15, 2005

(30) Foreign Application Priority Data

Jun. 14, 2004   (JP)   ............................. 2004-175276

(51) Int. Cl.
*H02M 1/12*   (2006.01)
*H02M 1/14*   (2006.01)
(52) U.S. Cl. ...................... 363/41; 363/21.1; 363/21.18
(58) Field of Classification Search .................. 363/41, 363/21.1, 21.18
See application file for complete search history.

(56) References Cited

U.S. PATENT DOCUMENTS

| 5,917,267 | A | * | 6/1999 | Miyazawa et al. | .......... 310/317 |
| 6,044,003 | A | * | 3/2000 | Toshinari et al. | .............. 363/97 |
| 6,047,135 | A | * | 4/2000 | Hamada | ...................... 396/55 |
| 6,331,748 | B1 | * | 12/2001 | Hong | .......................... 310/318 |
| 6,433,459 | B1 | | 8/2002 | Okada | |
| 6,563,283 | B2 | * | 5/2003 | Iwashita et al. | ............. 318/599 |
| 6,965,335 | B1 | * | 11/2005 | Trotter et al. | ................ 341/152 |
| 2003/0174005 | A1 | * | 9/2003 | Latham et al. | .............. 327/172 |

FOREIGN PATENT DOCUMENTS

JP   2001-178143   6/2001

* cited by examiner

*Primary Examiner*—Bao Q Vu
(74) *Attorney, Agent, or Firm*—Brinks Hofer Gilson & Lione

(57) ABSTRACT

A PWM signal generating circuit that generates a PWM signal having a period controlling portion for slightly fluctuating a period of the PWM signal; and a duty controlling portion for changing a duty of the PWM signal by changing a duty ratio in the period fluctuated by the period controlling portion.

9 Claims, 12 Drawing Sheets

| SPEED PARAMETER | PWM PERIODS | "H" VALUE PORTION | "L" VALUE PORTION | DUTY (%) | DUTY DIFFERENCE |
|---|---|---|---|---|---|
| 21 | 201 | 90 | 111 | 44.7761194 | 0.223880597 |
| 20 | 200 | 90 | 110 | 45 | 0.273631841 |
| 19 | 201 | 91 | 110 | 45.27363184 | 0.226368159 |
| 18 | 200 | 91 | 109 | 45.5 | 0.271144279 |
| 17 | 201 | 92 | 109 | 45.77114428 | 0.228855721 |
| 16 | 200 | 92 | 108 | 46 | 0.268656716 |
| 15 | 201 | 93 | 108 | 46.26865672 | 0.231343284 |
| 14 | 200 | 93 | 107 | 46.5 | 0.266169154 |
| 13 | 201 | 94 | 107 | 46.76616915 | 0.233830846 |
| 12 | 200 | 94 | 106 | 47 | 0.263681592 |
| 11 | 201 | 95 | 106 | 47.26368159 | 0.236318408 |
| 10 | 200 | 95 | 105 | 47.5 | 0.26119403 |
| 9 | 201 | 96 | 105 | 47.76119403 | 0.23880597 |
| 8 | 200 | 96 | 104 | 48 | 0.258706468 |
| 7 | 201 | 97 | 104 | 48.25870647 | 0.241293532 |
| 6 | 200 | 97 | 103 | 48.5 | 0.256218905 |
| 5 | 201 | 98 | 103 | 48.75621891 | 0.243781095 |
| 4 | 200 | 98 | 102 | 49 | 0.253731343 |
| 3 | 201 | 99 | 102 | 49.25373134 | 0.246268657 |
| 2 | 200 | 99 | 101 | 49.5 | 0.251243781 |
| 1 | 201 | 100 | 101 | 49.75124378 | 0.248756219 |
| 0 | 200 | 100 | 100 | 50 | 0.248756219 |
| -1 | 201 | 101 | 100 | 50.24875622 | 0.251243781 |
| -2 | 200 | 101 | 99 | 50.5 | 0.246268657 |
| -3 | 201 | 102 | 99 | 50.74626866 | 0.253731343 |
| -4 | 200 | 102 | 98 | 51 | 0.243781095 |
| -5 | 201 | 103 | 98 | 51.24378109 | 0.256218905 |
| -6 | 200 | 103 | 97 | 51.5 | 0.241293532 |
| -7 | 201 | 104 | 97 | 51.74129353 | 0.258706468 |
| -8 | 200 | 104 | 96 | 52 | 0.23880597 |
| -9 | 201 | 105 | 96 | 52.23880597 | 0.26119403 |
| -10 | 200 | 105 | 95 | 52.5 | 0.236318408 |
| -11 | 201 | 106 | 95 | 52.73631841 | 0.263681592 |
| -12 | 200 | 106 | 94 | 53 | 0.233830846 |
| -13 | 201 | 107 | 94 | 53.23383085 | 0.266169154 |
| -14 | 200 | 107 | 93 | 53.5 | 0.231343284 |
| -15 | 201 | 108 | 93 | 53.73134328 | 0.268656716 |
| -16 | 200 | 108 | 92 | 54 | 0.228855721 |
| -17 | 201 | 109 | 92 | 54.22885572 | 0.271144279 |
| -18 | 200 | 109 | 91 | 54.5 | 0.226368159 |
| -19 | 201 | 110 | 91 | 54.72636816 | 0.273631841 |
| -20 | 200 | 110 | 90 | 55 | 0.223880597 |
| -21 | 201 | 111 | 90 | 55.2238806 | 0.276119403 |
| -22 | 200 | 111 | 89 | 55.5 | |

Fig. 13

| SPEED PARAMETER | PWM PERIODS | "H" VALUE PORTION | "L" VALUE PORTION | DUTY (%) | DUTY DIFFERENCE |
|---|---|---|---|---|---|
| 21 | 200 | 90 | 110 | 45 | 0 |
| 20 | 200 | 90 | 110 | 45 | 0.5 |
| 19 | 200 | 91 | 109 | 45.5 | 0 |
| 18 | 200 | 91 | 109 | 45.5 | 0.5 |
| 17 | 200 | 92 | 108 | 46 | 0 |
| 16 | 200 | 92 | 553 { 108 | 554 { 46 | 0.5 |
| 15 | 551 { 200 | 93 | 107 | 46.5 | 0 |
| 14 | 200 | 93 | 552 { 107 | 46.5 | 0.5 |
| 13 | 200 | 94 | 106 | 47 | 0 |
| 12 | 200 | 94 | 106 | 47 | 0.5 |
| 11 | 200 | 95 | 105 | 47.5 | 0 |
| 10 | 200 | 95 | 105 | 47.5 | 0.5 |
| 9 | 200 | 96 | 104 | 48 | 0 |
| 8 | 200 | 96 | 104 | 48 | 0.5 |
| 7 | 200 | 97 | 103 | 48.5 | 0 |
| 6 | 200 | 97 | 103 | 48.5 | 0.5 |
| 5 | 200 | 98 | 102 | 49 | 0 |
| 4 | 200 | 98 | 102 | 49 | 0.5 |
| 3 | 200 | 99 | 101 | 49.5 | 0 |
| 2 | 200 | 99 | 101 | 49.5 | 0.5 |
| 1 | 200 | 100 | 100 | 50 | 0 |
| 0 | 200 | 100 | 100 | 50 | 0.5 |
| -1 | 200 | 101 | 99 | 50.5 | 0 |
| -2 | 200 | 101 | 99 | 50.5 | 0.5 |
| -3 | 200 | 102 | 98 | 51 | 0 |
| -4 | 200 | 102 | 98 | 51 | 0.5 |
| -5 | 200 | 103 | 97 | 51.5 | 0 |
| -6 | 200 | 103 | 97 | 51.5 | 0.5 |
| -7 | 200 | 104 | 96 | 52 | 0 |
| -8 | 200 | 104 | 96 | 52 | 0.5 |
| -9 | 200 | 105 | 95 | 52.5 | 0 |
| -10 | 200 | 105 | 95 | 52.5 | 0.5 |
| -11 | 200 | 106 | 94 | 53 | 0 |
| -12 | 200 | 106 | 94 | 53 | 0.5 |
| -13 | 200 | 107 | 93 | 53.5 | 0 |
| -14 | 200 | 107 | 93 | 53.5 | 0.5 |
| -15 | 200 | 108 | 92 | 54 | 0 |
| -16 | 200 | 108 | 92 | 54 | 0.5 |
| -17 | 200 | 109 | 91 | 54.5 | 0 |
| -18 | 200 | 109 | 91 | 54.5 | 0.5 |
| -19 | 200 | 110 | 90 | 55 | 0 |
| -20 | 200 | 110 | 90 | 55 | 0.5 |
| -21 | 200 | 111 | 89 | 55.5 | 0 |
| -22 | 200 | 111 | 89 | 55.5 | |

*Fig. 14*

METHOD OF CONTROLLING THE DUTY OF A PWM SIGNAL, PWM SIGNAL GENERATING CIRCUIT, AND IMAGE FORMING APPARATUS USING SAME

This application is based on Japanese Patent Application No. 2004-175276 filed in Japan on 14 Jun. 2004, the entire content of which is hereby incorporated by reference.

FIELD OF THE INVENTION

The present invention relates to a method of controlling the duty of a PWM (pulse width modulation) signal for driving an actuator of a PWM driving method, a PWM signal generating circuit, and an image forming apparatus using same.

DESCRIPTION OF RELATED ART

An impact piezoelectric actuator (linear actuator) has conventionally been known in which a driven member (mobile unit) such as a slider is attached to a bar-shaped driving member (driving shaft) by frictional coupling and a piezoelectric element is fixed to one end of the driving member. In the driving of the actuator, the driving speed can be controlled by changing the duty of the driving waveform (square wave) as disclosed, for example, in Japanese Laid-Open Patent Application No. 2001-103772. In order that the driving control by changing the duty is performed with higher precision, it is required to improve the resolution of the duty of the driving waveform. With respect to this, for example, Japanese Laid-Open Patent Application No. 2001-178143 discloses a technology to mix (combine) the driving waveforms of different duties with each other with a predetermined number of driving waveforms as one group and obtain the average value (average duty value) thereof to thereby pseudoly improve the resolution of the duty.

However, according to the technologies disclosed in the patent documents 1 and 2, a sound (an unusual sound; a vibration sound) occurs because when the duty is changed, the vibration condition is abruptly changed to a different condition due to the change of the duty. The volume of the occurring sound depends on the change rate of the duty when the duty is changed, and to turn down the volume of the sound (or to prevent the sound occurrence), it is necessary to reduce the change rate of the duty to thereby realize a smoother driving control.

When the duty of the driving waveform is changed by use of the PWM output function of a microcomputer (controller), to reduce the change rate of the duty, it is considered to increase the resolution of the duty by increasing the frequency of the clock signal (reference clock) in the microcomputer. However, according to this method, there is a restriction (limitation) on the clock frequency that can be used by the microcomputer. Even if the clock frequency is increased, the power consumption at the time of operation is increased.

SUMMARY OF THE INVENTION

The present invention is made in view of the above-mentioned problem, and an object thereof is to provide a method of controlling the duty of a PWM signal, a PWM signal generating circuit and an image forming apparatus using same with which a higher duty resolution can be obtained and the change rate of the duty can be reduced without the clock frequency increased and consequently, the sound occurrence when the duty is changed can be prevented.

The above-mentioned object is attained by providing the following structure:

A PWM signal generating circuit that generates a PWM signal according to the present invention is provided with: a period controlling portion for slightly fluctuating a period of the PWM signal; and a duty controlling portion for changing a duty of the PWM signal by changing a duty ratio in the period fluctuated by the period controlling portion.

According to the above-described structure, since the duty of the PWM signal is changed by changing the duty ratio in the period of the PWM signal while slightly fluctuating the period, a higher duty resolution can be obtained and the change rate of the duty can be reduced without the clock frequency increased, so that the occurrence of a sound when the duty is changed can be prevented.

The PWM signal generating circuit is further provided with a clock generating portion for generating a clock signal, and the period controlling portion and the duty controlling portion perform the slight fluctuation of the period and the change of the duty ratio in the period with a resolution corresponding to one pulse of the clock signal.

According to this structure, since the resolution for the slight fluctuation of the period and the change of the duty ratio corresponds to one pulse of the clock signal, a high duty resolution can be obtained without the clock frequency increased by making the most of the resolution (one pulse) by an existing clock signal, that is, with a simple structure using an existing clock signal.

The PWM signal generating circuit is further provided with: a clock counting portion for receiving the clock signal generated by the clock generating controlling and counting a clock pulse; an instructing portion for outputting an instruction signal specifying a necessary period and duty ratio for the PWM signal; a period setting portion for performing a setting associated with the slightly fluctuated period based on the instruction signal; a duty setting portion for performing a setting associated with the duty ratio based on a length of a high value or a low value of a signal during a period of the signal based on the instruction signal; a comparison portion for comparing a count value by the clock counter with set values set by the period setting portion and the duty setting portion; and an output portion for outputting the PWM signal based on a result of the comparison by the comparison portion.

According to this structure, in generating the PWM signal, the clock generating portion generates the clock signal, the clock counting portion receives the clock signal and counts the clock pulse, and the instruction portion outputs the instruction signal specifying the necessary period and duty ratio for the PWM signal. Moreover, the setting associated with the period (whose value slightly fluctuates) by the period setting portion and the setting associated with the duty ratio by the duty setting portion are performed based on the instruction signal, the comparison portion compares the count value by the clock counting portion with the set values set by the period setting portion and the duty setting portion, and the output portion outputs the PWM signal based on the result of the comparison. Consequently, a PWM signal generating circuit that outputs (generates) a PWM signal in which the duty is changed can be reliably provided by use of a simpler structure.

The PWM signal generating circuit is further provided with a piezoelectric actuator in which a driven member is attached to a bar-shaped driving means by frictional coupling and a piezoelectric element is fixed to one end of the driving member, and the period controlling portion and the duty controlling portion drive the piezoelectric actuator based on the PWM signal.

According to this structure, since the piezoelectric actuator in which the driven member such as a slider (image sensor provided integrally therewith) is attached to the bar-shaped driving member (rod) by frictional coupling and the piezoelectric element is fixed to one end of the driving member is driven by use of the PWM signal by the PWM signal generating circuit, by providing a structure using the PWM signal generating circuit and the piezoelectric actuator, for example, in the digital camera, the prevention of the occurrence of a sound when the duty is changed can be easily realized in the camera shake compensation control at the time of shooting with the camera.

Further, a duty control method of a PWM signal generating apparatus that generates a PWM signal according to the present invention is provided with: a period control step of slightly fluctuating a period of the PWM signal; and a duty control step of changing a duty of the PWM signal by changing a duty ratio in the period fluctuated by the period control step.

The duty control method is further provided with a clock generating step of generating a clock signal, and in the period control step and the duty control step, the slight fluctuation of the period and the change of the duty ratio in the period are performed with a resolution corresponding to one pulse of the clock signal.

The duty control method is further provided with: a clock count step of receiving the clock signal generated in the clock generating step and counting a clock pulse; an instruction step of outputting an instruction signal specifying a necessary period and duty ratio for the PWM signal; a period setting step of performing a setting associated with the slightly fluctuated period based on the instruction signal; a duty setting step of performing a setting associated with the duty ratio based on a length of a high value or a low value of a signal during a period of the signal based on the instruction signal; a comparison step of comparing a count value by the count means with set values set in the period setting step and the duty setting step; and an output step for outputting the PWM signal based on a result of the comparison by the comparison step.

Further, an image forming apparatus of the present invention is provided with: a clock generating portion for generating a clock signal; a clock counting portion for receiving the clock signal and counting a clock pulse; an instructing portion for outputting an instruction signal specifying a necessary period and duty ratio for a PWM signal; a period setting portion for performing a setting associated with the slightly fluctuated period based on the instruction signal; a duty setting portion for performing a setting associated with the duty ratio based on a length of a high value or a low value of a signal during a period of the signal based on the instruction signal; a comparison portion for comparing a count value by the clock counting portion with the set values set by the a period setting portion and the duty setting portion; an output portion for outputting the PWM signal based on a result of the comparison by the comparison portion; and a piezoelectric actuator that is driven based on the PWM signal by the output portion and in which a driven member is attached to a bar-shaped driving member by frictional coupling and a piezoelectric element is fixed to one end of the driving member.

Moreover, in the image forming apparatus, the output portion and the piezoelectric actuator constitute a camera shake prevention mechanism of the image forming apparatus.

BRIEF DESCRIPTION OF THE DRAWINGS

These and other objects and features of the present invention will become clear from the following description taken in conjunction with the preferred embodiments thereof with reference to the accompanying drawings, in which:

FIG. 13 is a view showing set values associated with the period and the duty ratio which values are set to a first and second register, and the values of the duty obtained based on the set values; and FIG. 14 is a view showing the set values associated with the period and the duty ratio and the values of the duty obtained based on the set values in the conventional case.

DETAILED DESCRIPTION OF THE PREFERRED EMBODIMENTS

Hereinafter, an embodiment of the present invention will be described with reference to the drawings.

(Description of the External Structure of the Image Forming Apparatus)

Figure 1:
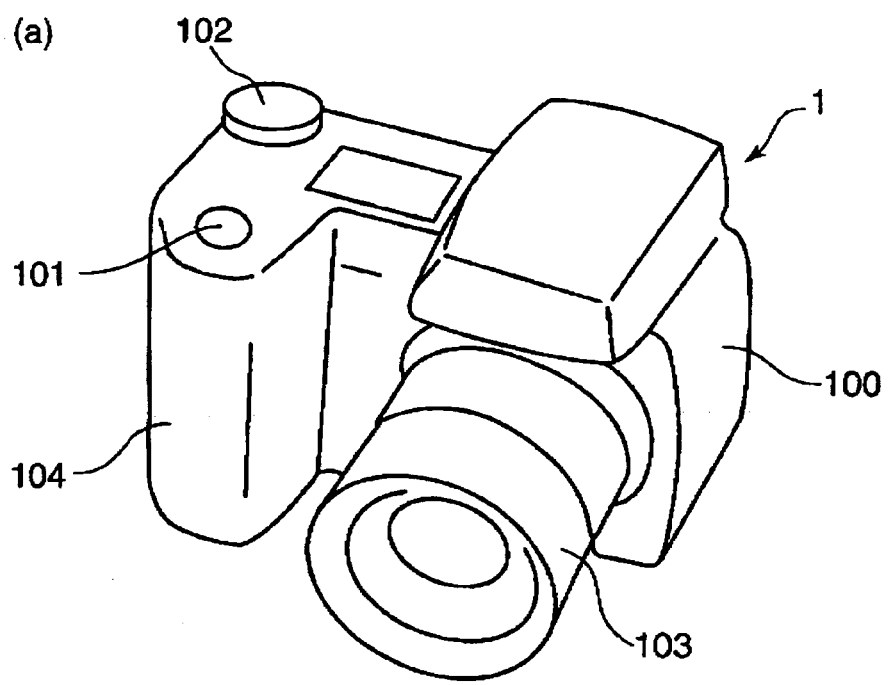
FIGS. 1(a) and 1(b) are perspective views showing the appearance of a digital camera as an image forming apparatus to which a PWM signal generating circuit according to the present invention is suitably applied, FIG. 1(a) being a view viewed from the front and FIG. 1(b) being a view viewed from the back.
Figure 1:
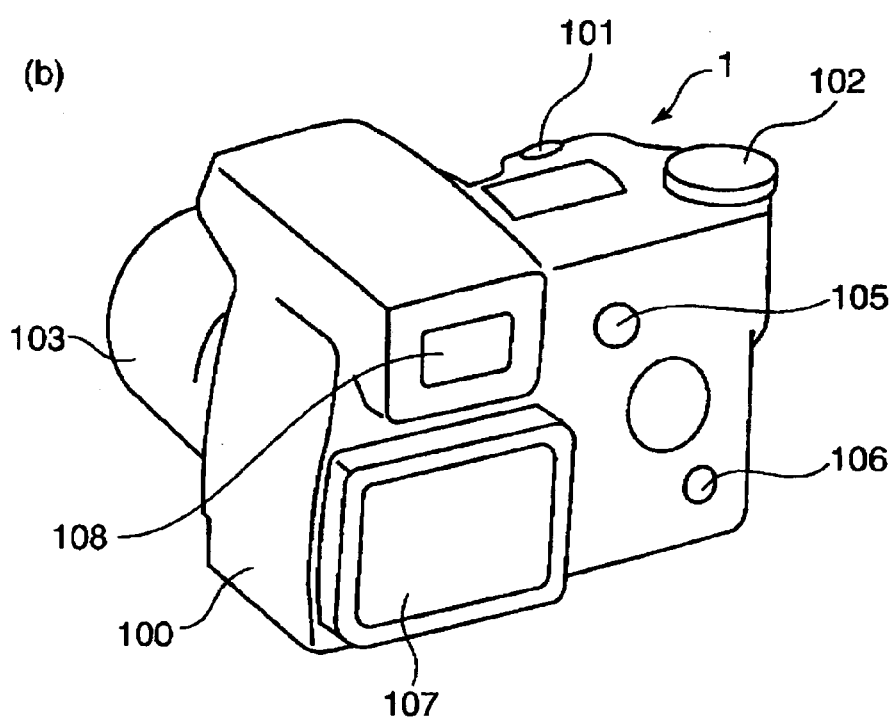

FIGS. 1(a) and (b) are perspective views showing the appearance of a digital camera 1 as an image forming apparatus to which a PWM signal generating circuit according to the present invention is suitably applied. FIG. 1(a) is a view viewed from the front. FIG. 1(b) is a view viewed from the back. In the digital camera 1, a release switch 101 and a mode setting switch 102 are disposed on the top surface side of a body 100, a taking lens portion 103 and a grip portion 104 are disposed on the front surface side, and various operation buttons such as a power switch 105 and a camera shake compensation switch 106, an LCD portion 107 comprising a liquid crystal monitor (LCD) and a finder portion 108 are disposed on the back surface side. Inside the body 100, various body devices are disposed including: a non-illustrated image sensor that detects the subject brightness, that is, performs photoelectric conversion into image signals of the R, G and B components in accordance with the light quantity of the subject light image formed by the taking lens portion 103 and outputs the image signals; and a circuit that generates a PWM signal and a piezoelectric actuator which will be described later. In addition to theses switches, push-button switches such as a zoom switch, a menu selection switch and a selection and enter switch or a setting display portion where the currently set (selected) modes and menus are displayed may be provided.

The release switch 101 which is for starting the shooting operation is a depression switch capable of being depressed halfway down into "half depressed condition" and being depressed all the way down into "fully depressed condition." For example, when the release switch 101 is depressed halfway down, preparation operations for taking an image of the subject (preparation operations such as automatic exposure control and automatic focus control) are performed, and when the release switch 101 is depressed all the way down, shooting operations (a series of shooting operations such as exposing the image sensor, performing predetermined image processing on the image signals obtained by the exposure and recording the image signals onto a memory card or the like) are performed. The mode setting switch 102 is for setting various shooting modes such as an automatic exposure control mode (AE mode), an automatic focus control mode, a flash mode and a continuous shooting mode.

The taking lens portion 103 functions as a lens window that captures light (light image) from the subject, and constitutes a taking lens system (for example, a zoom lens block or a stationary lens block disposed in series along the optical axis) for directing the light to the subsequently-described image sensor 110 or finder portion 108 disposed inside the body 100. The taking lens portion 103 is structured so that focus adjustment can be performed by a manual operation or by automatically moving the position of each lens. The grip portion 104 is provided in a protruding condition on one side end of the digital camera 1 for enabling the camera to be reliably held with one hand (or both hands). In the grip portion 104, a battery or the like for driving the camera can be incorporated. The power switch 105 is a depression switch for turning on (activating) or turning off (deactivating) the power of the digital camera 1. By the depression, the power of the camera can be turned on and off by turns.

The camera shake compensation switch 106 is for setting a shake compensation mode for enabling reliable shooting when there is a possibility that a "shake" such as a camera shake occurs at the time of shooting with the camera held with hands, telephoto shooting, or shooting in dark conditions (requiring long exposure). The LCD portion 107 is for displaying the shot image at the point of time when shooting is performed by a depression of the release switch 101, performing playback display of images recorded on the recording medium (the above-mentioned memory card or the like) incorporated in the body 100 or the like, and displaying a through image (live view image) of the subject taken during shooting standby or the like. The finder portion 108 is a so-called peep window (ocular portion).

(Description of the Electric Structure of the Image Forming Apparatus)

Figure 2:
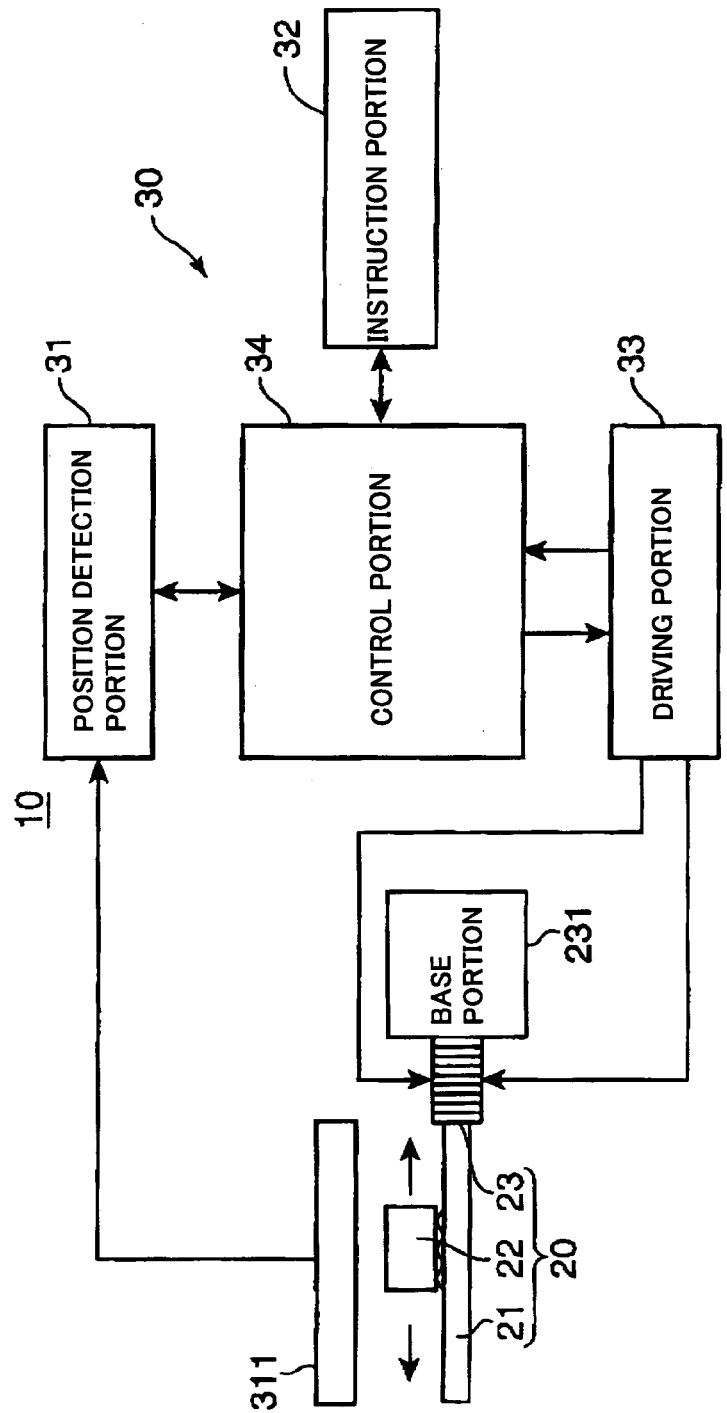
FIG. 2 is a block diagram showing an example of a shake compensation system including the PWM signal generating circuit.
Figure 3:
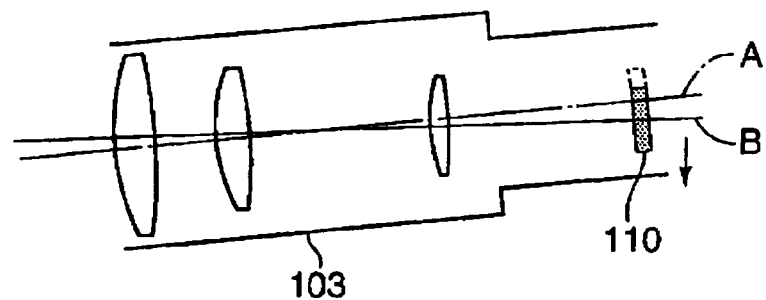
FIG. 3 is a schematic cross-sectional view explaining the movement of an image sensor with respect to a shake of the camera.

FIG. 2 is a block diagram showing an example of a shake compensation system including the PWM signal generating circuit according to the present invention. As shown in FIG. 2, a shake compensation system 10 comprises a piezoelectric actuator 20 and a PWM signal generating circuit 30. The piezoelectric actuator 20 is an impact linear actuator on which so-called ultrasonic driving is performed, and compensates for the shake by sliding a driven member (image sensor) of the piezoelectric actuator 20 in accordance with the amount of occurring shake. That is, for example, when a shake occurs on the camera and this shifts the optical axis incident on the taking lens portion (the taking lens portion 103 of the digital camera 1) from the optical axis designated A to the optical axis designated B with respect to each lens element as shown in FIG. 3, the shake is compensated for by shifting the image sensor 110 in accordance with the shift amount of the optical axis. The piezoelectric actuator 20 is provided with a rod portion 21, a slider portion 22 and a piezoelectric element portion 23.

The rod portion 21 is a bar-shaped driving member (driving shaft) having a predetermined cross-sectional shape and driven (shaken in the horizontal direction in FIG. 2) by the piezoelectric element portion 23, and supports the movement of the slider portion 22. The slider portion 22 is a driven member (mobile unit) that is frictionally coupled to the rod portion 21, that is, engaged therewith by a predetermined frictional force and slides along the axial direction of the rod portion 21 (in the horizontal direction of FIG. 2) in accordance with the driving (vibration) of the rod portion 21. The slider portion 22 is integrally provided with a non-illustrated image sensor (the image sensor 110) having a solid-state image sensor such as a CCD or a CMOS and an LED (infrared LED) for detecting the position of the slider portion 22.

The piezoelectric element portion 23 expands and contracts in accordance with the applied voltage, and vibrates the rod portion 21 in accordance with the expansion and contraction. In the expansion and contraction of the piezoelectric element portion 23, high-speed expansion and low-speed contraction or low-speed expansion and high-speed contraction are alternately repeated, or constant-speed expansion and constant-speed contraction where the expansion speed and the contraction speed are the same are alternately repeated. The piezoelectric element portion 23 comprises, for example, a stacked piezoelectric element, and is fixed to one end of the rod portion 21 so that the polarization direction coincides with the axial direction of the rod portion 21. A signal line from a driving portion 33 described later is connected to the electrode portion of the piezoelectric element portion 23, and the above-mentioned expansion and contraction is performed by the piezoelectric element portion 23 being charged or discharged (charged in the opposite direction) in response to a driving signal from the driving portion 33. By the piezoelectric element portion 23 thus repeating expansion and contraction, the slider portion 22 is moved in the normal or opposite direction (rightward or leftward) relatively to the rod portion 21 or is stopped at that position. To the end of the rod portion 21 opposite to the side of the piezoelectric element portion 23, a non-illustrated weight is fixed in order that the vibration caused by the piezoelectric element portion 23 is efficiently transmitted to the rod portion 21. This weight is fixed to the digital camera 1 (a predetermined position inside the camera) as a base portion 231 for the piezoelectric actuator 20. In this description, the vibration of the rod portion 21 by the piezoelectric element portion 23 is set, for example, to a frequency of approximately 60 kHz.

The PWM signal generating circuit 30 generates a PWM signal for actuator driving by the PWM driving method to the piezoelectric actuator 20. The PWM signal generating circuit 30 comprises a position detection portion 31, an instruction portion 32, the driving portion 33 and a control portion 34.

The position detection portion 31, which is a member (detection circuit) that detects the position of the slider portion 22 on the rod portion 21 based on the detection signal from a position detection element described later, receives the detection signal from the position detection element and outputs, to the control portion 34, position information (position detection signal) representative of the current position of the slider portion 22 corresponding to the received signal. The position detection portion 31 has a position detection device portion 311. The position detection device portion 311 has a position detection device such as a PSD (position sensitive device), and receives by the PSD the infrared light from the LED moving integrally with the slider portion 22 and outputs a detection signal corresponding to the position of the slider portion 22 to the position detection portion 31.

Figure 4:
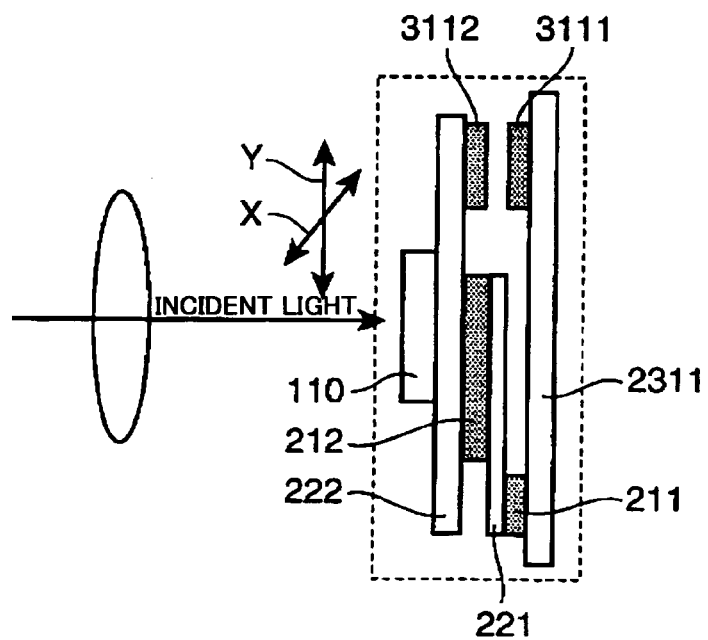
FIG. 4 is a schematic longitudinal cross-sectional view showing an example of a structure provided with a piezoelectric actuator in the shake compensation system.

As the position detection device portion 311, the digital camera 1 adopts one comprising a so-called two-dimensional PSD structured so that the position detection on the X-Y coordinates (two-dimensional coordinate axes) is possible. With respect to the two-dimensional position detection, the actual structure of the piezoelectric actuator portion and the position detection element portion in the shake compensation system 10 is such that the following two piezoelectric actuators are provided as shown in the schematic longitudinal cross-sectional view of FIG. 4; a first piezoelectric actuator 211 disposed in the direction of the X axis (the cross-sectional shape vertical to the axial direction of the actuator is shown); and a second piezoelectric actuator 212 disposed in the direction of the Y axis (the cross-sectional shape in the axial direction is shown).

The first piezoelectric actuator 211 is fixed to a support member 2311 corresponding to the base portion 231, and slides a frame member 221 corresponding to the slider portion 22 in the direction of the X axis. The second piezoelectric actuator 212 is fixed to the frame member 221 (corresponding to the base portion of the piezoelectric actuator 212), and slides a frame member 222 corresponding to the slider portion 22 in the direction of the Y axis together with the image sensor 110 disposed on the frame member 222. With this structure, the whole of the one comprising the frame member 221, the frame member 222, the second piezoelectric actuator 212 and the image sensor 110 is moved in the direction of the X axis by the first piezoelectric actuator 11, and the frame member 222 and the image sensor 110 are further moved in the direction of the Y axis by the second piezoelectric actuator 212 being moved.

On the support member 2311, a two-dimensional PSD 3111 corresponding to the position detection device portion 311 is disposed so as to be opposed to a two-dimensional infrared RED 3112 provided on the frame member 222. The two-dimensional PSD 3111 and the two-dimensional infrared RED 3112 detect the position of the image sensor 110 with respect to the movement in the direction of the X axis by the first piezoelectric actuator 211 and the position of the image sensor 110 with respect to the movement in the direction of the Y axis by the second piezoelectric actuator 212. In this manner, the compensation of the position of the image sensor 110 with respect to the shakes in the yaw direction (the direction of the X axis) and the pitch direction (the direction of the Y axis) in the digital camera 1 described later is performed.

Figure 5:
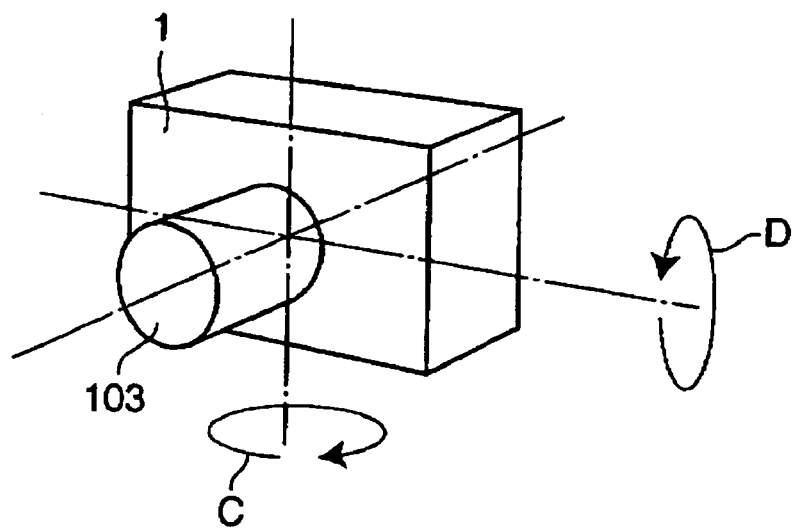
FIG. 5 is a perspective view explaining the shake direction of the camera.

The instruction portion 32 detects the shake of the digital camera 1, and outputs, to the control portion 34, position of the slider portion 22 (target position signal) for compensating for the blur of the image formed on the image sensor 110. The instruction portion 32 has a shake detection mechanism for detecting the shake. The shake detection mechanism comprises a so-called gyrosensor that detects the angular speeds of the digital camera 1 in the yaw direction designated C and the pitch direction designated D as shown in FIG. 5. Specifically, the instruction portion 32 calculates the angle signal (shake signal) by performing predetermined integration processing on the angular speed signal outputted in accordance with the inclinations of the digital camera 1 in the above-mentioned directions which inclinations are detected by the shake detection mechanism, calculates the shake direction and the shake amount by performing the processing of multiplying the angle signal by a gain corresponding to the focal length for the subject, and obtains the target position in moving the slider portion 22 (the image sensor 110) based on the calculated information (the slider portion 22 is moved toward this position). The target position signal (the above-mentioned shake signal) is set so as to be detected, for example, at servo periods of approximately 500 μsec (frequency: 2 kHz).

The driving portion 33 is for causing the piezoelectric actuator 20 to be driven by outputting a driving signal to the piezoelectric actuator 20 and charging or discharging the piezoelectric element portion 23 of the piezoelectric actuator 20 (driving circuit). Details of the structure and operation of the driving portion 33 will be described later.

The control portion 34 performs the operation control on the shake compensation, comprises a ROM (read only memory) storing control programs and the like, a RAM (random access memory) temporarily storing data and a CPU reading out the control programs and the like from the ROM and executing them, and performs various calculations for shake compensation control in accordance with the various signals from the position detection portion 31, the instruction portion 32, the driving portion 33 or the like.

Specifically, the control portion 34 A/D converts the position detection signal transmitted from the position detection portion 31, receives it as digital data, performs predetermined filter processing and integration processing on the received data, and calculates the current position of the slider portion 22 (the image sensor 110). On the other hand, the control portion 34 similarly receives the target position signal transmitted from the instruction portion 32, calculates the difference between these two pieces of data (the current position and the target position of the slider portion 22) (that is, the amount of movement from the current position), and calculates the suitable movement speed of the slider portion 22 (the speed parameter based on the movement speed) based on the information on the difference. The movement speed may be obtained, for example, by a calculation of the "difference"÷the "servo period" in order that (the movement of) the slider portion 22 can follow the shake, that is, as a speed necessary to eliminate the difference between the current position and the target position (the value of the difference is not necessarily completely zero but may have a preset predetermined error).

Further, the control portion 34 calculates predetermined set values for outputting the PWM signal such as a period and duty ratio described later based on the calculated information on the movement speed (speed parameter). Then, the control portion 34 outputs a setting signal (instruction signal) corresponding to the set values to the driving portion 33, and causes the driving portion 33 to generate the PWM signal for the driving of the piezoelectric actuator 20. The control portion 34 structures the control loop by a digital servo, and realizes high-speed and high-precision shake compensation by ensuring a short servo period sufficient for shake compensation. Moreover, the control portion 34 is provided with an oscillation element (not shown) such as a crystal oscillator as a clock generating portion that generates a clock signal, and outputs the clock signal to the driving portion 33. In the present embodiment, the frequency (the number of clocks) of the clock signal by the oscillation element is, for example, approximately 12 MHz (period: approximately 83 nsec).

Such a control portion 34 may be provided as one used specifically for the control of the shake compensation system 10 independently of a non-illustrated main control portion (main CPU) that controls the digital camera 1. In this case, the control portion 34 can select the operation mode and transmits and receives various kinds of data by communicating with the main control portion.

Figure 6:
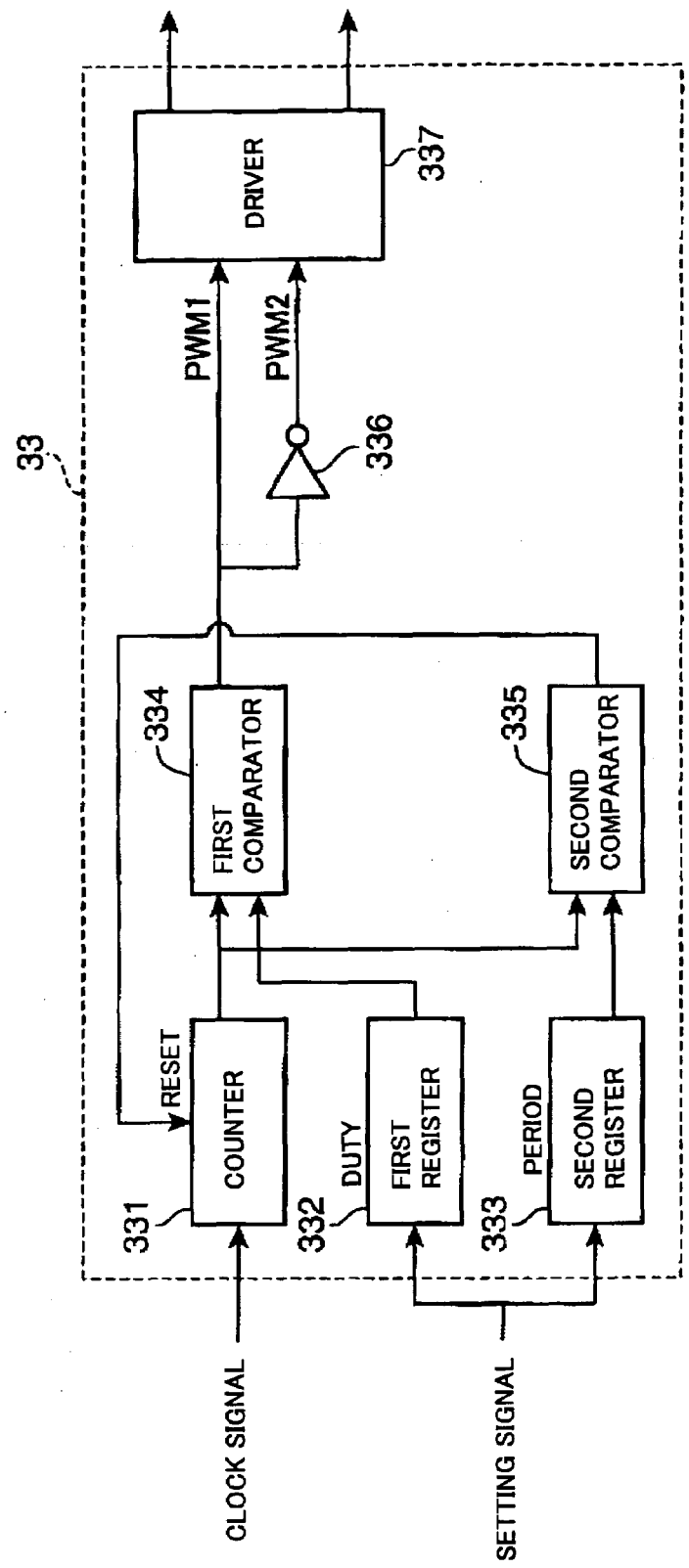
FIG. 6 is a block diagram showing an example of the structure of a driving portion.

FIG. 6 is a block diagram showing an example of the structure of the driving portion 33. In FIG. 6, the driving portion 33 is provided with: a counter 331 that counts the clock signal (clock pulse) outputted from the oscillation element of the control portion 34 and outputs the count value; a first register 332 for performing the setting associated with the duty ratio of the generated driving pulse (PWM signal) based on the setting signal from the control portion 34; a second register 333 for performing the setting associated with the period of the driving pulse (PWM signal) based on the setting signal; a first comparator 334 that compares the count value by the counter 331 with the set value set to the first register 332; a second comparator 335 that compares the count value by the counter 331 with the set value set to the second register 333; an inverting circuit 336 (inverter) that inverts the PWM signal outputted from the first comparator 334; and a driver 337, for the driving of the piezoelectric actuator 20, that outputs the driving voltage (driving signal) for charging and discharging the piezoelectric element portion 23 based on the PWM signal (PWM1 signal) outputted from the first comparator 334 and the PWM signal (PWM2 signal) outputted from the inverting circuit 336.

The counter 331 increments (counts up) the count value every time the clock signal is inputted, and outputs the count signal representative of the count value to the first and second comparators 334 and 335. When a reset signal (H signal outputted from the second comparator 335 described later) is inputted to the reset terminal provided on the counter 331, the counter 331 resets the count value to the initial value.

To the first register 332, a value corresponding to the interval of time during which the signal level in one period of the PWM signal is low (hereinafter, expressed as L) or high (hereinafter, expressed as H) is set. Note that as used previously and hereinafter, a period, P, of a signal is defined to be the amount of time that elapses from a beginning of a low value portion, L, of the PWM signal to the end of a high value portion, H, of the PWM signal that immediately follows the low value portion of the PWM signal. The above-mentioned duty ratio is the ratio between the length of time (Lt) of the L portion of the PWM signal (square wave) and the length of time (Ht) of the H portion, that is, the duty ratio Dt=Ht/(Lt+Ht)=Ht/P, wherein P=Ht+Lt. In the present embodiment, a value corresponding to the L period is set to the first register 332. To the second register 333, a value corresponding to the period (one period) of the PWM signal is set. However, the period is set so as to alternate, for example, between a period "200" and a period "201," that is, so that the value of the period slightly fluctuates as shown in FIG. 13 described later.

When the count value from the counter 331 is compared with the set value set to the first register 332 (referred to as first set value) and the count value is lower than the first set value (the count value<the first set value), the first comparator 334 outputs an L signal to the driver 337, and when the count value is equal to or higher than the first set value (the count value≧the first set value), the first comparator 334 outputs an H signal to the driver 337.

When the count value from the counter 331 is compared with the set value set to the second register 333 (referred to as second set value) and the count value<the second set value like the above-mentioned case, the second comparator 335 outputs the L signal to the counter 331, and when the count value≧the second set value, the second comparator 335 outputs the H signal to (the reset terminal of) the counter 331. The relationship between the first set value and the second set value is such that the second set value>the first set value.

The inverting circuit 336 inverts the L signal and the H signal in the PWM1 signal outputted from the first comparator 334 to thereby generate the PWM2 signal, and outputs the PWM2 signal to the driver 337. The driver 337 comprises, for example, a bridge circuit constituted by a predetermined number of switching elements (for example, N-channel or P-channel FETs), alternately generates a positive driving voltage (+Vp) for charging the piezoelectric element portion 23 and a negative driving voltage (−Vp) for discharging (charging in the opposite direction) the piezoelectric element portion 23, and outputs a driving signal comprising the driving voltages +V and −V to the piezoelectric actuator 20.

Figure 7:
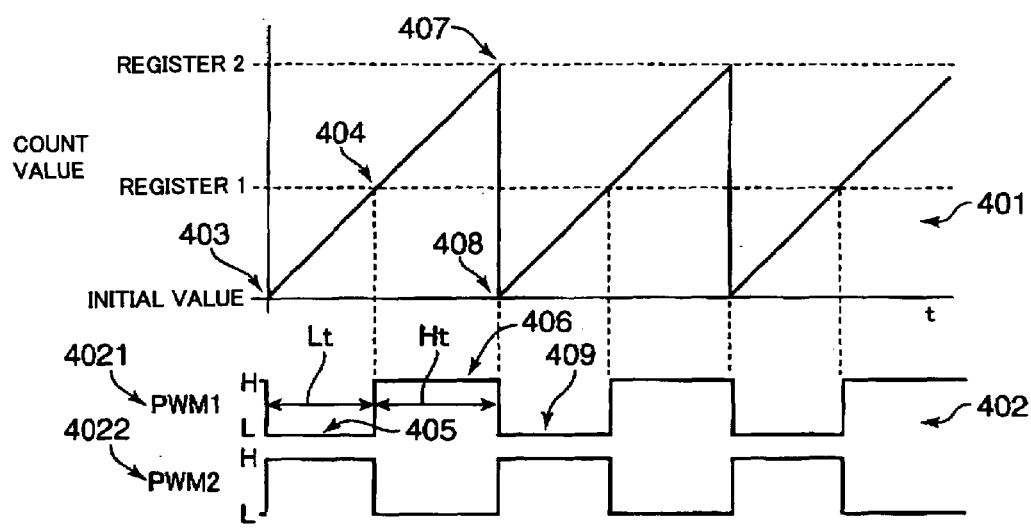
FIG. 7 is a view showing an example of the state of the change of a count value and a PWM signal.

FIG. 7 is a view showing an example of the state of the change of the count value and the PWM signal. In FIG. 7, reference numeral 401 shows the state of the change of the counter value of the counter 331, and reference numeral 402 shows the waveforms of the PWM 1 signal and the PWM2 signal (driving pulses) inputted to the driver 337. First, the count value is incremented from the initial value 403 by the counter 331 in response to the input of the clock signal as shown in the above-described FIG. 6. This count value is inputted to the first and second comparators 334 and 335. In a case where (in the period during which) the count value is lower than the first set value shown at reference numeral 404, the L signal shown at reference numeral 405 is outputted from the first comparator 334 (toward the driver 337). Moreover, since in the interval of time during which the count value is lower than the first set value, the count value inputted to the second comparator 335 is lower than the second set value, the L signal is outputted from the second comparator 335 (toward the counter 331). In this case, since the signal inputted to the counter 331 is the L signal, the counting up is continued without the count resetting by the counter 331 performed.

When the count value becomes equal to or higher than the first set value, the output signal from the first comparator 334 is switched from the L signal to the H signal shown at reference numeral 407. When the count value further increases to reach the second set value shown at reference numeral 407, the output signal from the second comparator 335 is switched from the L signal to the H signal. When the H signal is inputted to the counter 331, the counter 331 resets the count value back to the initial value shown at reference numeral 408. Since the count value is thus returned to the initial value, at the first comparator 334, the count value (initial value) is lower than the first set value, so that the output signal from the first comparator 334 is switched from the H signal shown at reference numeral 406 to the L signal shown at the reference numeral 409. In this manner, the PWM1 signal shown at reference numeral 4021 where the L signal and the H signal alternate with each other is outputted from the first comparator 334, and is inputted to the driver 337 together with the PWM2 signal shown at reference numeral 4022 and obtained by the inverting circuit 336 inverting the PWM1 signal.

From the above, by changing the second set value set to the second register 333, the period of the PWM signal, that is the period to when the count value becomes the second set value from the initial value, can be changed. Moreover, by changing the first set value set to the first register 332, the ratio between the length of time Lt of the L signal (length of time from the initial value to the first set value) shown in FIG. 7 and the length of time Ht of the H signal (length of time from the first set value to the second set value), that is, the duty ratio Dt of the PWM signal can be changed.

Figure 8:
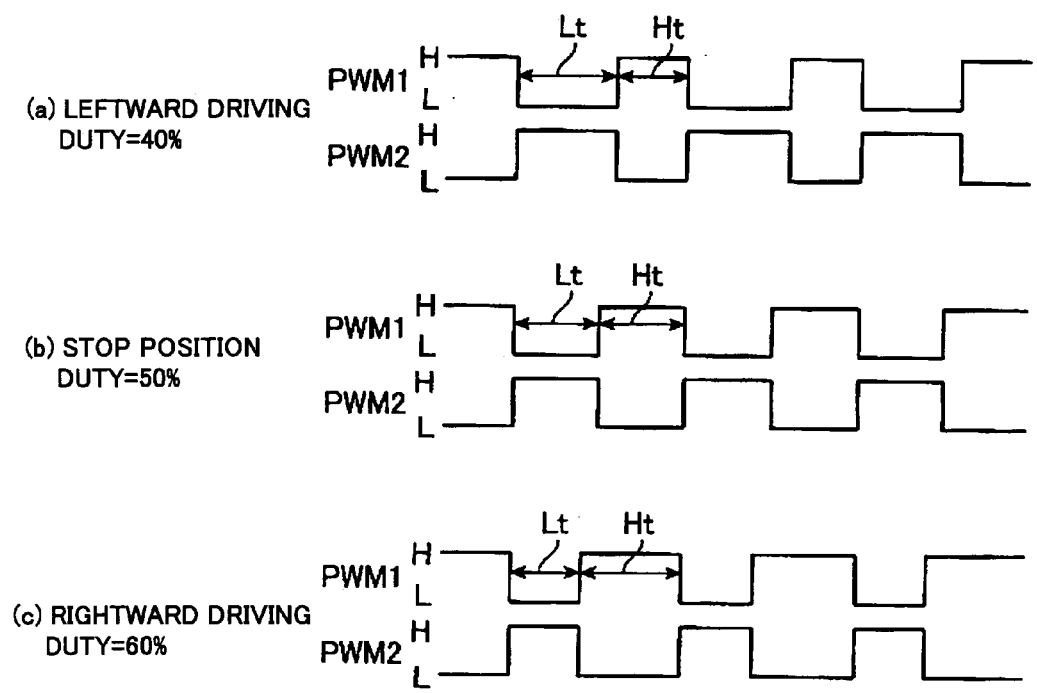
FIGS. 8(a) to 8(c) are views showing an example of the PWM signal at duties generated in the driving portion.

As described above, the period and the duty ratio are changed at the driving portion 33, for example as shown in FIGS. 8(a) to 8(c), driving pulses (the PWM1 signal and the PWM2 signal) whose duties (%) described later are approximately 40%, 50% and 60%, respectively, are outputted to the driver 337, a driving voltage is applied from the driver 337 to the piezoelectric actuator 20 in accordance with each driving pulse, and the slider portion 22 moves leftward or rightward in accordance with the driving voltage. When the driving pulse shown in FIG. 8(b) is outputted, the slider portion 22 is stopped at that position.

(Description of the Operation)

According to the present invention, by changing the first set value, that is the duty ration, while slightly fluctuating the second set value, that is the value of the period of the PWM signal, a duty with a high resolution is obtained. This will be described below. In this description, the ratio between the lengths of time Ht and Lt is expressed as the "duty ratio," and the duty ratio calculated as a value is expressed as the "duty" (the duty ratio and the duty are substantially the same).

FIG. 13 is a view showing the set values associated with the period and the duty ratio which values are set to the first register 332 and the second register 333, and the value of the duty obtained based on the set values. In FIG. 13, the leftmost column shown at reference numeral 501 (column 501) shows a speed parameter which is a parameter value associated with the movement speed of the slider portion 22. The column shown at reference numeral 502 (column 502) shows a period (PWM period) as the second set value set to the second register 333. The value of this period corresponds to the count value shown at reference numeral 407 in FIG. 7. The columns shown at reference numerals 503 and 504 (columns 503 and 504) show the values of the length of time Ht ("H" portion) and the length of time Lt ("L" portion) associated with the duty ratio which values are set to the first register 332. In this description, the value of the length of time Lt is set as the first set value, and the value of the length of time Lt corresponds to the count value of the position shown at reference numeral 404 in FIG. 7. When the value of the length of time Lt is determined, the value of the length of time Ht is also determined as the difference when the value of the length of time Lt is subtracted from the value of the period of the PWM signal. The column shown at reference numeral 505 (column 505) shows the value of the duty (%) obtained based on the set lengths of time Ht and Lt (duty ratio). The column shown at reference numeral 506 (column 506) shows the value of the difference between the obtained duties (%).

The speed parameter shown in the column 501 varies to "+21" and "−22" in the upward and downward directions in FIG. 13 with the value "0" (the duty at this time is 50%) shown at reference numeral 507, as the base point. As mentioned above, this speed parameter is determined in accordance with the movement speed of the slider portion 22 suitable for eliminating the difference between the current position and the target position of the slider portion 22 which movement speed is calculated based on the difference by the control portion 34. When the speed parameter is "0," the values of the current position and the target position of the slider portion 22 are the same, which indicates that it is unnecessary to move the slider portion 22.

Figure 9:
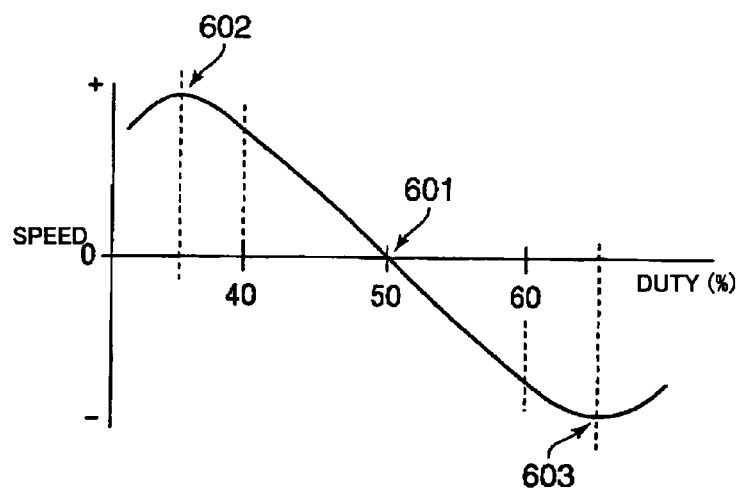
FIG. 9 is a view showing an example of the characteristic of the movement speed of a slider portion when the duty is changed in the driving control of the piezoelectric actuator.

FIG. 9 is a view showing an example of the characteristic of the movement speed of the slider portion 22 when the duty is changed in the driving control of the piezoelectric actuator 20. As shown in FIG. 9, when the duty is 50% shown at reference numeral 601, the movement speed is "0" and the slider portion 22 is stopped (in this case, although the rod portion 21 is always vibrating, since the vibration speeds in the rightward and leftward directions are the same, the movement is stopped relatively to the rod portion 21). When the duty changes toward the 0% side, the movement speed increases in the positive direction, and when the duty changes toward the 100% side, the movement speed increases in the negative direction. Here, when the duty changes toward the 0% side (the movement speed increases in the positive direction), the slider portion 22 moves leftward in FIG. 2, and when the duty changes toward the 100% side (the movement speed increases in the negative direction), the slider portion 22 moves rightward. Moreover, as shown in FIG. 9, on the positive side, the movement speed is the maximum value, for example, at the position shown at reference numeral 602 where the duty is approximately 35%, and on the negative side, the movement speed is the minimum value, for example, at the position shown at reference numeral 603 where the duty is approximately 65%.

Based on this characteristic, the range of the duty % (column 505) and the speed parameter (column 501) for the control of the piezoelectric actuator 20 in the present embodiment are set so as to use the characteristic of the linear part between where the duty is approximately 40% (a little less than 40%) and where the duty is approximately 60% (a little more than 60%) shown in FIG. 9. The part being used is not limited to the range of approximately 40% to 60%, but an arbitrary range may be set.

In accordance with the speed parameters determined as described above, the numerical value of the PWM period shown in the column 502 is set to the second register 333, and the numerical value of the "L" portion shown in the column 504 is set to the first register 332. As the PWM period, for example, numerical values "200" and "201" are alternately set every time the speed parameter changes by "one" step. The "L" portion is set so as to change by "one" step every time the speed parameter changes by "2" steps. For example, in FIG. 13, when the speed parameter changes by "one" step from "17" to "20," in accordance therewith, the PWM period alternately changes like "201," "200," "201," "200" as shown at reference numeral 508, and during this period, the "L" portion changes by one step like "109," "110" as shown at reference numerals 509 and 510.

By making a setting such that the value of the PWM period is alternately set, that is, the value of the "L" portion is changed, that is, the duty ratio is changed while (the value of) the PWM period is slightly fluctuated as described above, a different duty (%) is obtained every time the speed parameter is changed by "one" step (unit step) and a high-precision duty (high duty resolution) is obtained where the difference between the values of the obtained duties averages approximately 0.25%. The resolution (change resolution) for varying (changing) the numerical values of the PWM period and the "L" portion ("H" portion) corresponds to one pulse (the above-mentioned period of 83 nsec) of the clock signal (clock pulse). This is because the numerical values of the PWM period and the "L" portion ("H" portion) correspond to the count values obtained by the counting by the counter 331 based on the clock signal and therefore, the resolution that sets the numerical values is dependent on the clock signal (clock frequency).

Making a comparison with FIG. 14 showing the set values and the duty in the conventional case corresponding to the FIG. 13 to clarify the difference from the conventional case, in FIG. 14, for example, the speed parameter increases by one step from "14" to "17," whereas the PWM period is fixed to "200" as shown at reference numeral 551 and the "L" portion changes by one step like "107," "108" as shown at reference numerals 552 and 553 while the speed parameter changes from "14" to "17." For this reason, even if the speed parameter changes by "one" step, the duty (%) does not change and remains "46" as shown at reference numeral 554, that is, it is necessary to change the speed parameter by "two" steps to change the duty, and the duty obtained in this case is 0.5% which is higher than the above-mentioned approximately 0.25% and the resolution of the duty is low. Also from this comparison with the conventional case, according to the present invention, the resolution of the duty is improved and a finer duty responsive to the change of the speed parameters can be obtained without the clock frequently increased.

Figure 10:
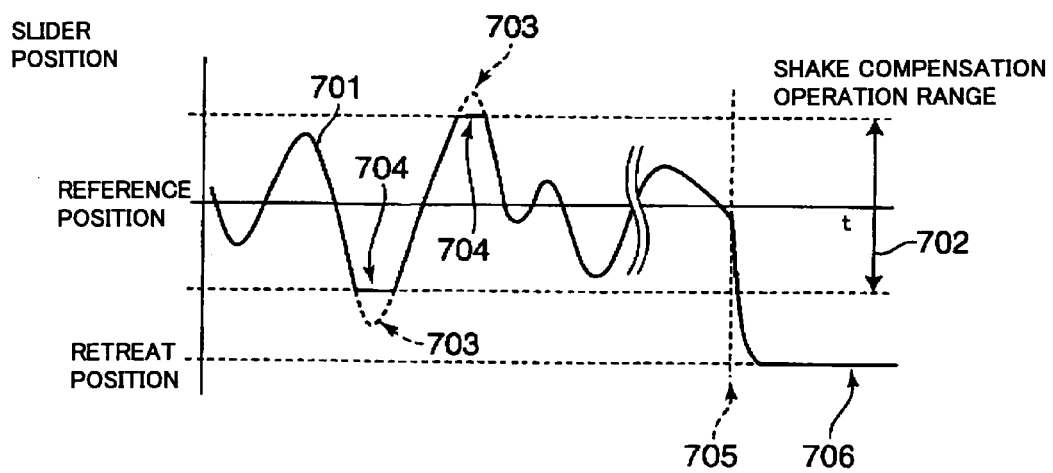
FIG. 10 is a view showing an example of the state of the fluctuation of the position of the slider portion in the shake compensation.

FIG. 10 is a view showing an example of the state of the fluctuation of the position (slider position) in the shake compensation of the slider portion 22. In the shake compensation, (the image sensor 110 that moves integrally with) the slider portion 22 is moved in accordance with the shake of the digital camera 1 to thereby perform the shake compensation, and in this case, the slider portion 22 (the image sensor 110) fluctuates rightward and leftward (upward and downward in FIG. 10) with respect to the reference position like the locus of reference numeral 701. The fluctuation range of the slider portion 22 in the shake compensation is limited, for example, to the predetermined range shown at reference numeral 702 (the shake compensation operation range 702), that is, a limitation is placed on the distance of the change from the reference position in the rightward and leftward directions, and when a shake is caused that is equal to or larger than the shake (shake amount) occurring in the fluctuation within the shake compensation operation range 702, the target position of the slider portion 22 may be fixed for example, not to the position estimated at reference numeral 703 but to a position, at an end of the shake compensation operation range 702, shown at reference numeral 704. By thus placing a limitation on the fluctuation range of the slider portion 22, a so-called "eclipse" where the image sensor 110 largely moves with respect to the lens and the light quantity in the peripheral part of the image plane significantly decreases, for example, due to vignetting can be prevented from occurring.

To stop the shake compensation operation, when the camera shake compensation switch 106 of the digital camera 1 is depressed to perform the turning off operation or the power switch 105 is depressed to perform the turning off operation, for example, at the position shown at reference numeral 705 (referred to as OFF position 705), the slider portion 22 is retreated (moved) to a predetermined retreat position shown at reference numeral 706. Even if the power switch 105 is depressed to turn off the power, the electric power (power source) for retreat driving until the completion of the retreat driving is ensured. The control to limit the fluctuation range of the slider portion 22 (operate as a limit function) is performed by the control portion 34.

Figure 11:
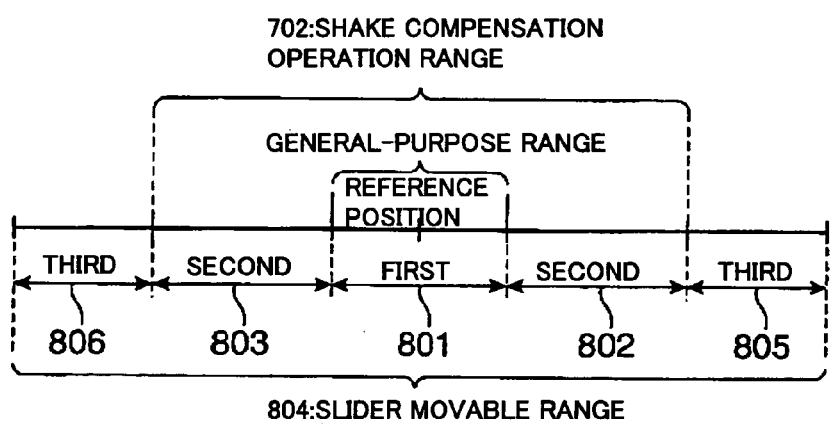
FIG. 11 is a view conceptually explaining the retreat position of the slider portion.

FIG. 11 is a view conceptually explaining the retreat position of the slider portion 22. As shown in FIG. 11, the slider portion 22 fluctuates with respect to the rod portion 21 in the shake compensation operation range 702 in the shake compensation. In the actual fluctuation, a general-purpose range is present in which the slider portion 22 frequently fluctuates with respect to the reference position. The general-purpose range is designated a first range 801, and the part of the shake compensation operation range 702 excluding the first range 801 is designated second ranges 802 and 803. Moreover, the range shown at reference numeral 804 is designated a slider movable range (slider movable range 804) in which the slider portion 22 can be moved (driven), and the part of the slider movable range 804 excluding the shake compensation operation range 702 is designated third ranges 805 and 806. Here, the second range 802 and the third range 805 are situated on the base end side (the piezoelectric element portion 23 side) of the rod portion 21 shown in FIG. 21.

In the driving control of the slider portion 22 where the driving ranges are the above-mentioned ones, in cases such as when the shake compensation driving is performed over a long time, a predetermined resin component or the like in the rod portion 21 is eluted due to the frictional heat between the rod portion 21 and the slider portion 22, and if the slider portion 22 is left in this state (position), there is a possibility that the rod portion 21 and the slider portion 22 adhere to each other. In order to prevent this, the following is preferable: After the turning off operation is performed as described above, the driving of the piezoelectric actuator 20 is not immediately stopped, but the driving is stopped after the slider portion 22 is retreated (retreat driving) at least to a position outside the first range 801, that is, a position in the second range 802 or the third range 805, or a position over both the second range 802 and the third range 805 (position including the boundary). The retreat position may be a position in the second range 803 or the third range 806 or a position over both the second range 803 and the third range 806 on the tip side of the rod portion 21.

Figure 12:
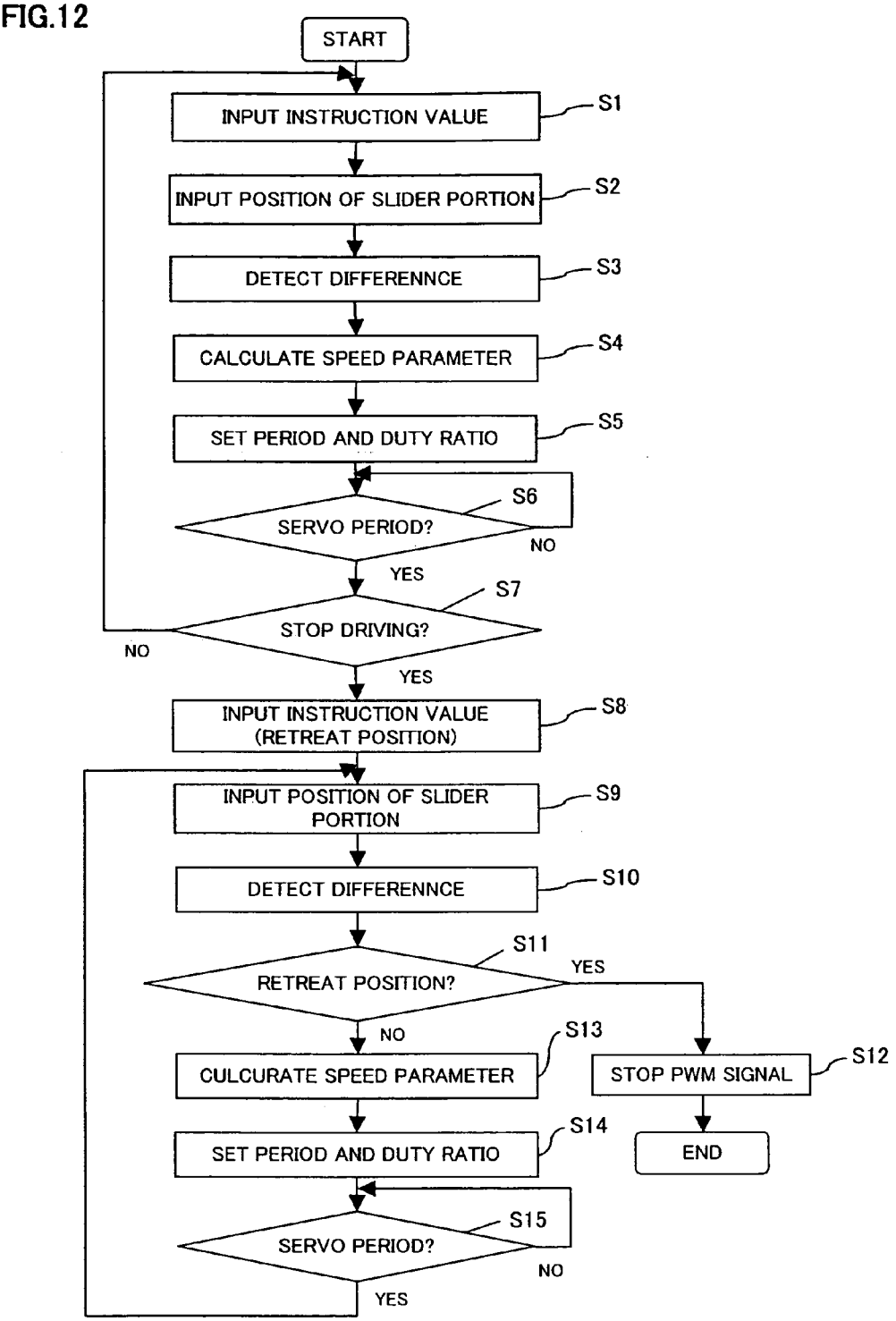
FIG. 12 is a flowchart showing an example of the operation associated with the shake compensation control according to the present embodiment.

FIG. 12 is a flowchart showing an example of the operation associated with the shake compensation control according to the present embodiment. First, the information (instruction value) on the target position of the slider portion 22 for compensating for the shake is inputted from the instruction portion 32 to the control portion 34 (step S1), and the information on the current position of the slider portion 22 is inputted from the position detection portion 31 to the control portion 34 (step S2). Then, the difference between the target position and the current position is detected (calculated) based on the target position information and the current position information (step S3), and a necessary speed parameter in the movement of the slider portion 22 associated with the shake compensation is calculated based on the information on the difference (step S4). Further, the period and the duty ratio corresponding to the calculated speed parameter are set, that is, the first set value associated with the duty ratio of the PWM signal is set to the first register 332 based on the setting signal (instruction signal) from the control portion 34, the second set value associated with the period of the PWM signal is set to the second register 333 similarly based on the setting signal (instruction signal) from the control portion 34, and the shake compensation driving (the movement of the slider portion 22 toward the target position) by the piezoelectric actuator 20 is performed based on the PWM signal (the PWM1 and PWM2 signals) generated in accordance with these settings (step S5). After a predetermined servo period (for example, approximately 500 .mu. has elapsed (YES at step S6), when the driving is not stopped (NO at step S7), the process returns to the above-described step S1, the period and the duty ratio are similarly set from the information on the target position and the current position, and shake compensation based on the setting is performed.

When the driving is stopped at step S7 (YES at step S7), the information on the target position as the position to which the slider portion 22 is retreated is inputted from the instruction portion 32 to the control portion 34 (step S8), the information representative of the current position of the slider portion 22 is inputted from the position detection portion 31 to the control portion 34 (step S9), and the difference between the target position and the current position is detected based on the target position information in the retreat and the current position information (step S10). When the value of the detected difference is within a predetermined error range (or the value of the difference is zero) and it is detected that the slider portion 22 is at the retreat position (YES at step S11), the generation of the PWM signal (PWM driving) is stopped and the driving of the piezoelectric actuator 20 is stopped (step S12) to end this flow.

When the slider portion 22 has not reached the retreat position at the above-described step S11 (NO at step S11), a necessary speed parameter of the slider portion 22 associated with the retreat driving is calculated based on the information on the difference detected at the above-described step S10 (step S13). Then, the period and the duty ratio corresponding to the calculated speed parameter is set similarly to the above-described step S5, and based on the PWM signal generated in accordance with these settings, the retreat driving of the piezoelectric actuator 20 (the movement of the slider portion 22 toward the retreat position) is performed (step S14). After a predetermined servo period (for example, approximately 500 μsec the same as that of the above described step S6) has elapsed (YES at step S15), the process returns to the above-described step S9, the period and the duty ratio are set based on the information on the current position of the slider portion 22 and the information on the target position already inputted to the control portion 34 at the above-described step S8, and the retreat driving is continued.

As described above, according to the PWM signal generating circuit 30 and the method of controlling the duty of a PWM signal according to the present invention, since the duty of the PWM signal (the PWM1 signal and the PWM2 signal) is controlled (changed) by changing the duty ratio (Dt: the first set value set to the first register 332) in the period of the PWM signal (the second set value set to the second register 333) while slightly fluctuating the period, a higher duty resolution can be obtained and the change rate (corresponding to the duty difference of FIG. 13) of the duty (%) can be reduced without the clock frequency increased, so that the occurrence of a sound (an unusual sound) when the duty is changed can be prevented.

Moreover, in the PWM signal generating circuit 30 and the method of controlling the duty of a PWM signal, since the resolution for the slight fluctuation of the period and the change of the duty ratio in the period corresponds to one pulse of the clock signal (clock pulse), a higher duty resolution can be obtained without the clock frequency increased by making the most of the resolution (one pulse) by an existing clock signal, that is, with a simple structure using an existing clock signal.

Moreover, in the PWM signal generating circuit 30, in generating the PWM signal, the oscillation element of the control portion 34 generates the clock signal, and the counter 331 receives the clock signal and counts the clock pulse. On the other hand, the instruction signal (setting signal) specifying a necessary period and duty ratio for the PWM signal is outputted from the instruction portion 32 and the control portion 34 (both are instruction means) to the (driving portion 33), and the setting associated with the period (slightly fluctuating value) by the second register 333 and the setting associated with the duty ratio Dt (value associated with the length of time Ht of the high portion of the signal in one interval of time or the length of time Lt of the low portion thereof) by the first register 332 are performed based on the instruction signal. Then, the count value of the counter 331 and the second set value set to the second register 333, and the count value and the first set value set to the first register 332 are compared with each other by the second comparator 335 and the first comparator 334, respectively, and the PWM signal (the PWM1 signal and the PWM2 signal) is outputted by the driving portion 33 (or the first comparator 334; either is the output means) based on the result of the comparison, so that a PWM signal generating circuit that outputs (generates) a PWM signal in which the duty is changed can be reliably provided by use of a simpler structure.

Moreover, the method of controlling the duty of a PWM signal is provided with: a step where the clock signal is generated (by the control portion 34) in generating the PWM signal; a step where the clock signal is received and the clock pulse is counted (by the counter 331); a step where the instruction signal (setting signal) specifying a necessary period and duty ratio for the PWM signal is outputted (by the instruction portion 32 and the control portion 34); a step where the setting associated with the period (slightly fluctuating value) is performed (by the second register 333) based on the instruction signal; a step where the setting associated with the duty ratio (value associated with the length of time Ht of the high portion of the signal in one period of the PWM signal or the length of time Lt of the low portion thereof) is performed (by the first register 332) based on the instruction signal; a step where the count value obtained by the counting (by the counter 331) is compared with the second set value set (to the second register 333) in association with the period of the PWM signal and the first set value set (to the first register 332) in association with the duty ratio; and a step where the PWM signal is outputted (by the driving portion 33 (or the first comparator 334)) based on the result of the comparison, so that a method of controlling the duty of a PWM signal in which a PWM signal with a controlled duty is outputted (generated) can be reliably provided by use of a simpler structure.

Moreover, since the piezoelectric actuator 20 in which the slider portion 22 (the image sensor 110 provided integrally therewith) is frictionally coupled to the rod portion 21 and the piezoelectric element portion 23 is fixed to one end of the rod portion 21 is driven based on the PWM signal (the PWM1 signal and the PWM2 signal) generated by the PWM signal generating circuit 30, by providing a structure using the PWM signal generating circuit 30 and the piezoelectric actuator 20, for example, in the digital camera 1, the prevention of the occurrence of a sound when the duty is changed can be easily realized in the shake compensation control at the time of shooting with the camera.

Moreover, according to the image forming apparatus (the digital camera 1) of the present invention, in the PWM signal generating circuit 30, the oscillation element of the control portion 34 generates the clock signal and the counter 331 receives the clock signal and counts the clock pulse. On the other hand, the instruction signal (setting signal) specifying a necessary period and duty ratio for the PWM signal is outputted from the instruction portion 32 and the control portion 34 (to the driving portion 33), and the setting associated with the period of the PWM signal (slightly fluctuating value) by the second register 333 and the setting associated with the duty ratio Dt (value associated with the length of time Ht of the high portion of the PWM signal in one period of the PWM signal or the length of time Lt of the low portion thereof) by the first register 332 are performed based on the instruction signal. Then, the count value of the counter 331 and the second set value set to the second register 333, and the count value and the first set value set to the first register 332 are compared with each other by the second comparator 335 and the first comparator 334, respectively, and the PWM signal is outputted by the driving portion 33 (or the first comparator 334) based on the result of the comparison.

Since the piezoelectric actuator 20 comprising the slider portion 22, the rod portion 21 and the piezoelectric element portion 23 is driven based on the PWM signal outputted (generated) by the PWM signal generating circuit 30 (by use of the driving signal outputted by the driver 337 based on the generated PWM signal), the PWM signal is reliably generated by use of a simpler structure by the PWM signal generating circuit 30, and a higher duty resolution can be obtained and the change rate of the duty can be reduced based on the PWM signal, so that an image forming apparatus can be provided in which the driving control of the piezoelectric actuator 20 where the occurrence of a sound when the duty is changed is prevented.

Moreover, since the PWM signal generating circuit 30 and the piezoelectric actuator 20 are incorporated in the image forming apparatus (the digital camera 1) as a camera shake prevention mechanism (the shake compensation system 10), an image forming apparatus can be provided in which a higher duty resolution can be obtained and the camera shake compensation driving (piezoelectric actuator driving) where the occurrence of a sound when the duty is changed is prevented can be performed in the camera shake compensation control.

The present invention can take the following modes:

(A) The period may be slightly fluctuated not by use of two period values (PWM periods) such as "200" and "201" as shown in the column 502 of FIG. 13 but by use of a larger number of period values, for example, three period values "199," "200" and "201." In this case, the period may be slightly fluctuated by repeating the period in the order of "199," "200" and "201."

(B) While in the present embodiment, the PWM signal generating circuit 30 and the piezoelectric actuator 20 are used for camera shake compensation, the present invention is not limited thereto. For example, they may be used for zoom driving, focusing driving or the like. Moreover, the PWM signal generating circuit 30 and the piezoelectric actuator 20 may be applied not only to a digital camera but also to an analog camera or a video camera, or, for example, to a mobile telephone or the like having a digital camera function (image forming function). Moreover, they may be applied to an apparatus other than an apparatus having an image forming function.

(C) While in the present embodiment, as shown in FIG. 7, the PWM signal is outputted from the first comparator 334 so as to be the L signal (Lt) during the portion of the period when the count value is between the initial value and the first set value shown at reference numeral 404 and the PWM signal is outputted so as to be the H signal (Ht) during the portion of the period when the count value is between the first set value and the second set value shown at reference numeral 407, the PWM signal may be outputted so that the L signal and the H signal are reversed, that is, the H signal is outputted during the portion of the period when the count value is between the initial value and the first set value and the L signal is outputted during the portion of the period when the count value is between the first set value and the second set value.

(D) The duty Dt may be defined as Dt=Lt/(Lt+Ht).

(E) A higher duty resolution may be obtained by also increasing the clock frequency simultaneously with the performance of the PWM driving by use of the PWM signal generating circuit 30 (method) of the present invention.

As described above, according to the present invention, a higher duty resolution can be obtained and the change rate of the duty can be reduced without the clock frequency increased, so that the occurrence of a sound when the duty is changed can be prevented.

Moreover, according to the present invention, an image forming apparatus can be provided in which the PWM signal is reliably generated by use of a simpler structure by the PWM signal generating circuit, a higher duty resolution can be obtained and the change rate of the duty can be reduced based on the PWM signal, and consequently, the driving control of the piezoelectric actuator in which the occurrence of a sound when the duty is changed is prevented can be performed.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A pulse width modulation (PWM) signal generating circuit that generates a PWM signal, comprising:
   a period controlling portion for slightly fluctuating a period, P, of the PWM signal, wherein the period, P, is the amount of time that elapses from a beginning of a low value portion of the PWM signal to the end of a high value portion of the PWM signal that immediately follows the low value portion of the PWM signal; and
   a duty controlling portion for changing a duty of the PWM signal by changing a duty ratio in the period fluctuated by the period controlling portion, wherein the duty ratio is defined by Ht/P, wherein Ht is the length of time of the high value portion.

2. A PWM signal generating circuit as claimed in claim 1, further comprising: a clock generating portion for generating a clock signal, wherein the period controlling portion and the duty controlling portion perform the slight fluctuation of the period and the change of the duty ratio in the period with a resolution corresponding to one pulse of the clock signal.

3. A PWM signal generating circuit as claimed in claim 2, further comprising:
   a clock counting portion for receiving the clock signal generated by the clock generating portion and counting a clock pulse;
   an instructing portion for outputting an instruction signal specifying a necessary period and duty ratio for the PWM signal;
   a period setting portion for performing setting associated with the slightly fluctuated period based on the instruction signal;
   a duty setting portion for performing setting associated with the duty ratio based on a length of time of the high value portion or a low value portion of a signal in the period based on the instruction signal;
   a comparison portion for comparing a count value by the clock counter with set values set by the period setting portion and the duty setting portion; and
   an output portion for outputting the PWM signal based on a result of the comparison by the comparison portion.

4. A PWM signal generating circuit as claimed in claim 1, further comprising: a piezoelectric actuator in which a driven member is attached to a bar-shaped driving member by frictional coupling and a piezoelectric element is fixed to one end of the driving member, wherein the period controlling portion and the duty controlling portion drive the piezoelectric actuator based on the PWM signal.

5. A duty control method of a pulse width modulation (PWM) signal generating apparatus that generates a PWM signal, comprising:

a period control step of slightly fluctuating a period, P, of the PWM signal, wherein the period, P, is the amount of time that elapses from a beginning of a low value portion of the PWM signal to the end of a high value portion of the PWM signal that immediately follows the low value portion of the PWM signal; and a duty control step of changing a duty of the PWM signal by changing a duty ratio in the period fluctuated by the period control step, wherein the duty ratio is defined by Ht/P, wherein Ht is the length of time of the high value portion.

6. A duty control method as claimed in claim 5, further comprising: a clock generating step of generating a clock signal, wherein, in the period control step and the duty control step, the slight fluctuation of the period and the change of the duty ratio in the period are performed with a resolution corresponding to one pulse of the clock signal.

7. A duty control method as claimed in claim 6, further comprising:

a clock count step of receiving the clock signal generated in the clock generating step and counting a clock pulse;

an instruction step of outputting an instruction signal specifying a necessary period and duty ratio for the PWM signal;

a period setting step of performing setting associated with the slightly fluctuated period based on the instruction signal;

a duty setting step of performing setting associated with the duty ratio based on a length of time of the high value portion or the low value portion of a signal in the period based on the instruction signal;

a comparison step of comparing a count value by the clock count step with set values set in the period setting step and the duty setting step; and an output step for outputting the PWM signal based on a result of the comparison by the comparison step.

8. An image forming apparatus, comprising:

a means for forming an image;

a clock generating portion for generating a clock signal;

a clock counting portion for receiving the clock signal and counting a clock pulse;

an instructing portion for outputting an instruction signal specifying a necessary period, P, and duty ratio for a PWM signal, wherein the period, P, is the amount of time that elapses from a beginning of a low value portion of the PWM signal to the end of a high value portion of the PWM signal that immediately follows the low value portion of the PWM signal and wherein the duty ratio is defined by Ht/P, wherein Ht is the length of time of the high value portion;

a period setting portion for performing setting associated with the slightly fluctuated period based on the instruction signal;

a duty setting portion for performing setting associated with the duty ratio based on a length of time of the high portion or the low portion of a signal in the period based on the instruction signal;

a comparison portion for comparing a count value by the clock counting portion with the set values set by the period setting portion and the duty setting portion;

an output portion for outputting the PWM signal based on a result of the comparison by the comparison portion; and a piezoelectric actuator that is driven based on the PWM signal by the output portion and in which a driven member is attached to a bar-shaped driving member by frictional coupling and a piezoelectric element is fixed to one end of the driving member.

9. An image forming apparatus as claimed in claim 8, wherein the output portion and the piezoelectric actuator constitute a camera shake prevention mechanism of the image forming apparatus.

* * * * *